United States Patent
Benato

(10) Patent No.: US 7,597,266 B2
(45) Date of Patent: Oct. 6, 2009

(54) METHOD FOR MAKING A SMART CARD ANTENNA ON A THERMOPLASTIC SUPPORT AND RESULTING SMARTCARD

(75) Inventor: Pierre Benato, Roquefort les Pins (FR)

(73) Assignee: ASK S.A., Sophia Antipolis (FR)

( * ) Notice: Subject to any disclaimer, the term of this patent is extended or adjusted under 35 U.S.C. 154(b) by 164 days.

(21) Appl. No.: 10/550,294

(22) PCT Filed: Mar. 26, 2004

(86) PCT No.: PCT/FR2004/000777

§ 371 (c)(1),
(2), (4) Date: Sep. 21, 2005

(87) PCT Pub. No.: WO2004/088582

PCT Pub. Date: Oct. 14, 2004

(65) Prior Publication Data

US 2006/0181478 A1    Aug. 17, 2006

(30) Foreign Application Priority Data

Mar. 28, 2003    (FR) .................................... 0303817

(51) Int. Cl.
*G06K 19/06*    (2006.01)
(52) U.S. Cl. ................. 235/492; 343/700 MS
(58) Field of Classification Search .......... 235/492, 235/488, 449, 493; 343/895, 700 MS
See application file for complete search history.

(56) References Cited

U.S. PATENT DOCUMENTS

| | | | |
|---|---|---|---|
| 5,598,032 A * | 1/1997 | Fidalgo | 257/679 |
| 6,173,898 B1 * | 1/2001 | Mande | 235/488 |
| 6,320,753 B1 * | 11/2001 | Launay | 361/760 |
| 6,390,375 B2 * | 5/2002 | Kayanakis | 235/492 |
| 6,459,588 B1 * | 10/2002 | Morizumi et al. | 361/737 |
| 6,501,440 B2 * | 12/2002 | Matsushita et al. | 343/895 |
| 6,575,374 B1 * | 6/2003 | Boyadjian et al. | 235/492 |
| 6,591,494 B2 * | 7/2003 | Okamura et al. | 29/832 |
| 6,772,953 B2 * | 8/2004 | Iiyama et al. | 235/492 |
| 6,786,419 B2 * | 9/2004 | Kayanakis | 235/492 |
| 6,848,622 B2 * | 2/2005 | Kudo et al. | 235/492 |
| 2001/0002035 A1 * | 5/2001 | Kayanakis | 235/492 |
| 2006/0176181 A1 * | 8/2006 | Halope | 340/572.8 |

FOREIGN PATENT DOCUMENTS

| | | |
|---|---|---|
| EP | 1 189 168 | 3/2002 |
| FR | 2 782 821 | 3/2000 |
| WO | WO 00/13138 | 3/2000 |
| WO | WO 01/03188 | 1/2001 |
| WO | WO 01/95252 | 12/2001 |

* cited by examiner

*Primary Examiner*—Seung H Lee
(74) *Attorney, Agent, or Firm*—James C. Lydon

(57) ABSTRACT

A method for making a hybrid contact/non-contact or non-contact smart card which includes a support (10,11) on which is produced an antenna, two card bodies (32, 42, 34, 44) on either side of the support, each of the card bodies including at least one thermoplastic layer, and one chip (30) or module connected to the antenna. The method includes the following steps: depositing a layer of a material having a major amount of resin on a predetermined zone (12,13) of the antenna support; making the antenna which includes screen-printing turns (14.15) and two connection pads (16,18,17,19) of conductive polymer ink on the zone previously produced on the support, and subjecting the support to a heat treatment to cure the ink.

12 Claims, 4 Drawing Sheets

METHOD FOR MAKING A SMART CARD ANTENNA ON A THERMOPLASTIC SUPPORT AND RESULTING SMARTCARD

TECHNICAL FIELD

The present invention relates to hybrid contact-contactless smart card or contactless smart cards antennae manufacturing methods and relates particularly to a manufacturing method for the antenna of a smart card on a thermoplastic support and the smart card obtained by said method.

BACKGROUND

Contactless smart cards or hybrid contact-contactless smart cards are equipped mainly with an antenna embedded in the card and an electronic module connected to the antenna. These cards allow the exchange of information with the outside by remote, and therefore contactless, electromagnetic coupling, between their antenna and a second antenna located in the associated reader. In the case of a hybrid card, this exchange may also be done by electrical transmission of data between the flush contacts of the card's electronic module and the contacts of a reader's reading head into which the card is inserted. These cards are now used in many sectors. In this manner, in the transport sector, they are used as a means of access to the transport network. This is also the case for bank cards. Hybrid or contactless cards are used in all types of debit/credit account operations, a recent example being the electronic wallet. Many companies have also developed identification means for their personnel using contactless smart cards.

The electronic module inserted into the hybrid contact-contactless or contactless smart card is used for developing, storing and processing the information. The connection of the electronic module and the antenna is one of the significant manufacturing problems for smart cards. The dimensions required by the usual standards for smart cards makes their manufacture that much more tricky when an electronic module and an antenna connected together have to be inserted.

The manufacture of antennae by a screen-printing method using conductive ink has allowed the manufacturing constraints to be considerably reduced. Several antennae are screen printed at a time by one or more deposits of conductive ink such as silver and this makes this first step of manufacturing hybrid or contactless smart cards much faster and less expensive than methods used previously. Furthermore, the manufacturing of a screen printed antenna enables a very great adherence to be obtained for the antenna on its thermoplastic support and thus partly overcome the problem of detection of the antenna contacts during the connection step of the module and the antenna in the case of hybrid smart cards.

Unfortunately, the drawbacks of this type of antenna appear during the second manufacturing step of the card, which consists in laminating the various layers with plastic material that make up the card on either side of the antenna support. As the material flow is significant during the lamination step as a result of the high pressure and temperature, the antenna's shape factor is not maintained. The conductive ink forming the antenna contains only 15% of binder, which results in a mechanical strength that is insufficient in temperature and pressure conditions of the order of 180° C. and 280 bar. As a result, there appear variations in the electrical parameters (inductance and resistance) of the antenna and this results in malfunctions. In addition, it is not uncommon to experience antenna breakage in areas where strong shear stresses are present. This is particularly the case in corners and at electrical bridges.

The document WO 01/95252 describes a contactless smart card including an antenna on a support, and the antenna may be made by printing using conductive ink. The invention described particularly concerns a strip of smart cards consisting of a support strip (1) whose softening temperature is at least 110° C., preferably 180° C., and a cover strip whose softening temperature is not greater than 110° C. It also concerns a method used to manufacture this smart card strip. This method consists in manufacturing this smart card strip in the form of a continuous strip made up of a support strip and a cover strip fixed to one another.

The document EP 1 189 168 also describes a contactless smart card including an antenna on a support, the antenna and the chip being supported by biodegradable material.

SUMMARY OF THE INVENTION

This is why the purpose of this invention is to provide a hybrid contact-contactless or contactless smart card whose antenna screen printed on a thermoplastic support is not subjected to any damage during the manufacturing process of the card and particularly in the lamination step.

The purpose of the invention is thus a manufacturing method for an antenna of a hybrid contact-contactless or contactless smart card that includes a support on which the antenna is made, two card bodies on each side of the support, each of the card bodies consisting of at least one thermoplastic layer, and a chip or a module connected to the antenna. This method includes the steps of:

depositing a layer of a material mainly consisting of resin on a predetermined zone of the antenna support, manufacturing the antenna, consisting in screen printing turns and two connection pads of electrically conductive polymer ink on a zone prepared beforehand on the support and subjecting the support to heat treatment in order to bake the ink.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE INVENTION

Figure 1:
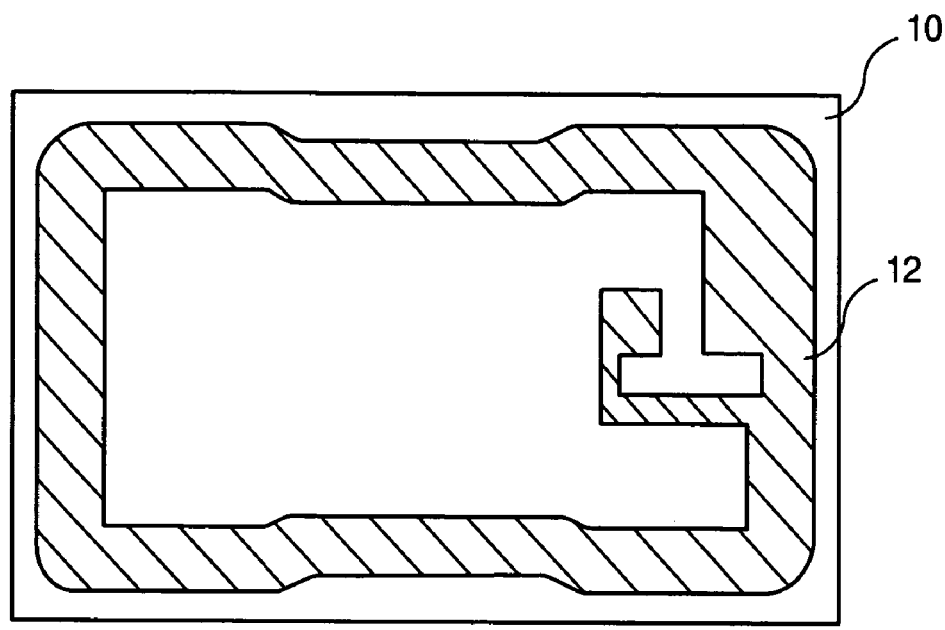
FIG. 1 represents the preliminary deposition step of resin on the antenna support of a hybrid contact-contactless smart card.

According to FIG. 1, resin is deposited on the antenna support 10 made of thermoplastic material of a hybrid contact-contactless smart card on a zone 12 corresponding to the location of the antenna and connection pads of the antenna with the module. The details of the shape of the zone 12 do not constitute a limitation for the invention, the main constraint being that the zone 12 defines the location where the conductive ink forming the turns and the connection pads of the antenna will be printed afterwards. Zone 12 is preferably slightly larger than the antenna's imprint as can be seen on the following FIGS. 2 and 5. The thickness of the resin layer applied is of the order of 5 µm.

Figure 2:
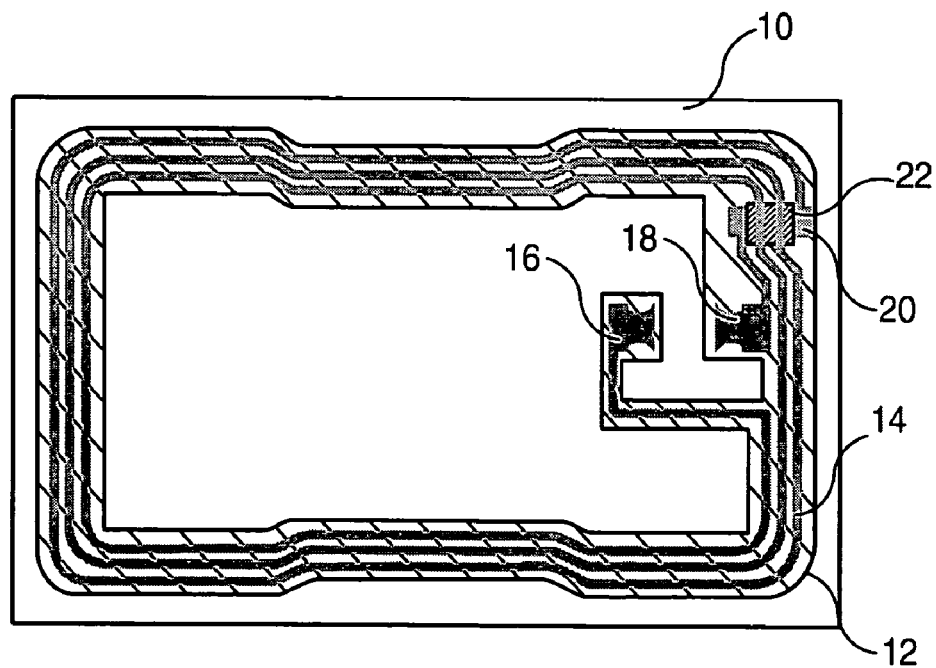
FIG. 2 represents the antenna screen printed on its support of a hybrid contact-contactless smart card.

According to a preferred embodiment of a hybrid contact-contactless smart card antenna shown in FIG. 2, the antenna is screen printed on zone 12 of the antenna support 10 in several passes and in reverse order compared with the standard screen printing method. The first pass consists in screen printing the two connection pads 16 and 18 of the antenna to the module and the electric bridge 20, commonly referred to as "cross-over". The second pass consists in screen printing an insulating strip 22 on top of the cross-over. The third screen printing pass consists in screen printing the turns of the antenna 14. A fourth pass is provided to add a layer of ink on the connection pads 16 and 18. The thickness of the conductive ink layer is of the order of 50 µm. The turns of the antenna 14 connect the connection pad 18 located at one end of the cross-over 20 and the other end of the cross-over 20 where the connection pad 16 is located. The ink forming the entire antenna is a conductive polymer type ink, doped with conductive components such as silver, copper or carbon. The antenna support 10 is then subjected to a heat treatment to cure the ink.

Figure 3A:
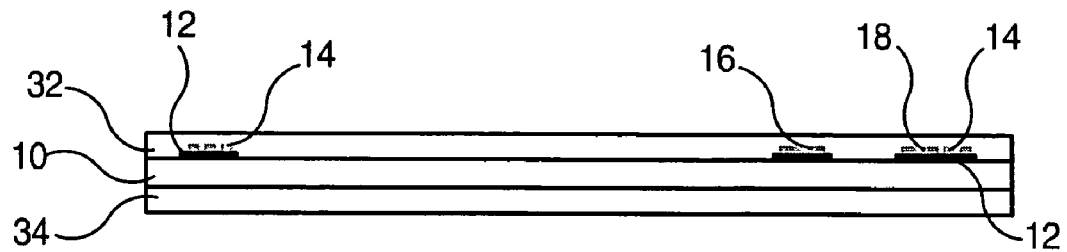
FIGS. 3a and 3b represent a cross-section of the hybrid contact-contactless smart card after the first and second steps of lamination respectively.

The following step consists in laminating two layers or sheets of thermoplastic material on the antenna support as shown in FIG. 3a. This first lamination step consists in welding by hot press moulding on each side of the antenna support 10 two homogenous layers of thermoplastic material 32 and 34 with a thickness of 100 µm. The temperature and the pressure reached are of the order of 180° C. and 280 bar respectively. During this first lamination step, the temperature must be sufficient for the material that makes up the sheets 32 and 34 to soften and melt completely so as to trap the raised designs of the antenna supports such as those caused by turns and antenna contacts. In this manner, during lamination, the antenna support 10 is trapped in the thermoplastic mass of layers 32 and 34.

Figure 3B:
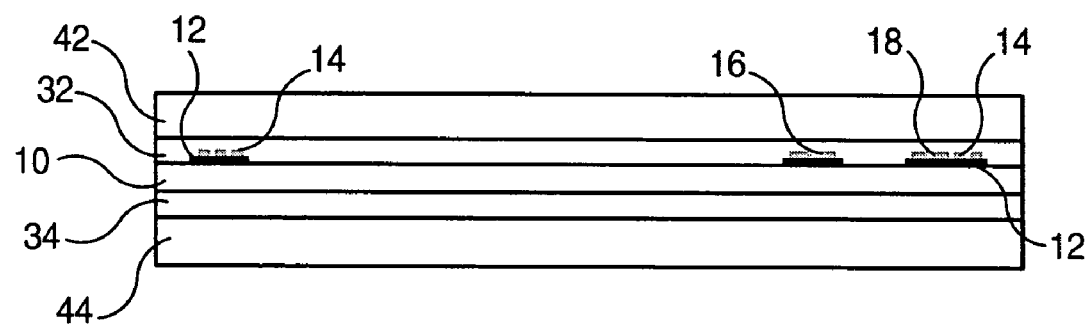

The second lamination stage of various layers that make up the card consist in laminating two card bodies on each side of the antenna support obtained after the first lamination step with reference to FIG. 3b. This second step, carried out after a certain duration corresponding to the time required for the thermoplastic layers 32 and 34 to solidify, consists in welding two thermoplastic layers 42 and 44, of equal thickness of about 260 µm, constituting the body of the card on the thermoplastic layers 32 and 34, by hot press moulding. The two card bodies 42 and 44 were previously printed using the customized graphic image of the card. The temperature and pressure necessary for this lamination step are of the order of 120° C. and 150 bar respectively.

The two lamination steps described previously may be replaced by a single lamination step consisting in welding, by hot press moulding, on each side of the antenna support at least two thermoplastic layers, corresponding for example to layers 32 and 42 on one side and 34 and 44 on the other side constituting the two card bodies, without deviating from the scope of the invention.

The card obtained after one or more lamination steps is therefore made up of a support 10 and two card bodies located on either side of the support, each card body being made of at least one thermoplastic layer and preferably at least two thermoplastic layers 32 and 42 on one side of the support and 34 and 44 on the other side.

Figure 3C:
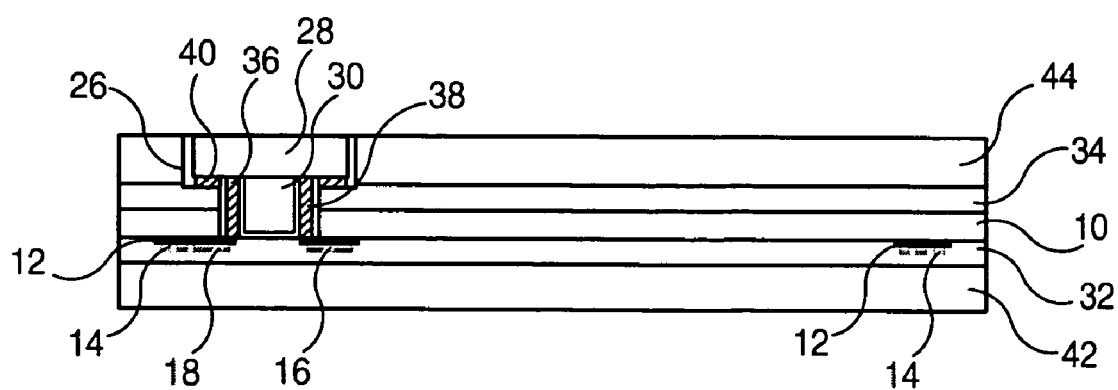
FIG. 3c represents a cross-section of a hybrid contact-contactless smart card with its module.

In reference to FIG. 3c, the last manufacturing step for the hybrid contact-contactless card is the installation of the module. A cavity 26 designed to receive the module consisting of the chip 30 and the double-sided circuit 28 is milled in one of the card bodies. The milling operation also enables the bonding pads 16 and 18 between the antenna and the module to be removed. The milling operation is carried out in the card body which is opposite the antenna support face with the screen printed imprint, that is to say in the card body which is in contact with the side of the support that do not bear the screen printed antenna. In this manner, during the milling operation, the antenna support is milled before the ink.

The module is glued in place. Two different adhesives are used. Two spots of conductive glue 36 and 38 are used to connect the module to the antenna contacts. A ring of glue 40 such as cyanoacrylate glue secures the perimeter of the module to the card.

The method according to the invention, presents the advantage of making the detection of the antenna easier during the milling step that consists in exposing the antenna's connection pads to connect the electronic module. While the antenna's screen printed connection pads may be almost completely cut into during milling of the cavity, there is no risk they will become detached from their support.

Figure 4:
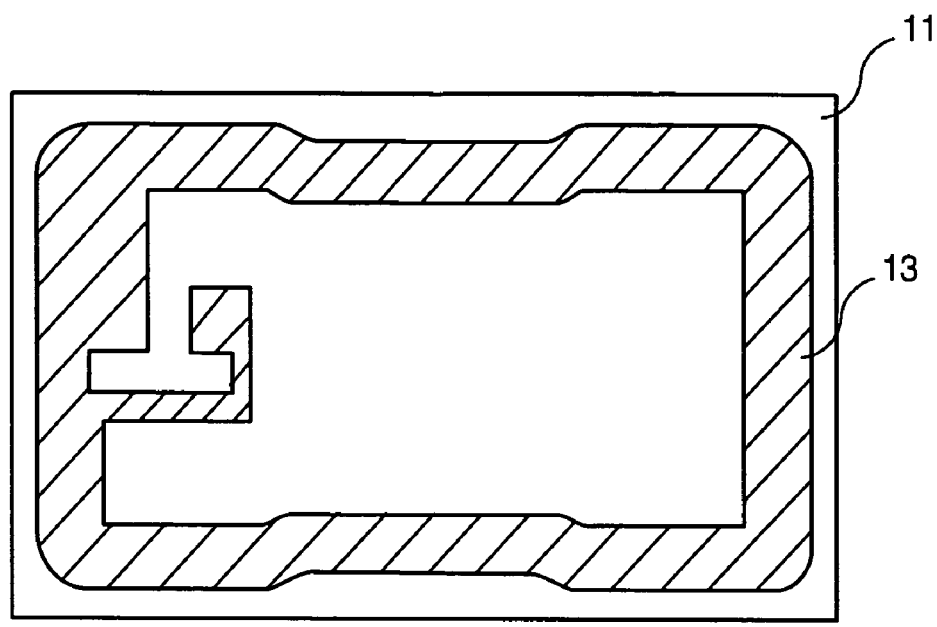
FIG. 4 represents the preliminary step of resin deposition on the antenna support of a contactless smart card.

According to a preferred embodiment of a contactless smart card antenna shown in FIG. 4, resin is deposited on the thermoplastic antenna support 11 of a contactless smart card on zone 13 corresponding to the location of the antenna and the connection pads of the antenna with the module. The resin zone 13 of a pure contactless smart card is reversed in relation to the resin zone 12 of a hybrid contact-contactless smart card. This special feature is inherent in the subsequent steps of the manufacture of the contactless card. Thus, the second step of the manufacturing method of a contactless smart card on its support that consists in screen printing the antenna through several passes of conductive ink is not performed in the same order as for the manufacturing step of the hybrid contact-contactless smart card antenna. The essential characteristic of the method of embodiments of the invention being that the antenna is manufactured on zone 12 or 13 where resin has been deposited previously, this characteristic is present in the production of the antenna support according to the invention, regardless of the subsequent use of the card.

Figure 5:
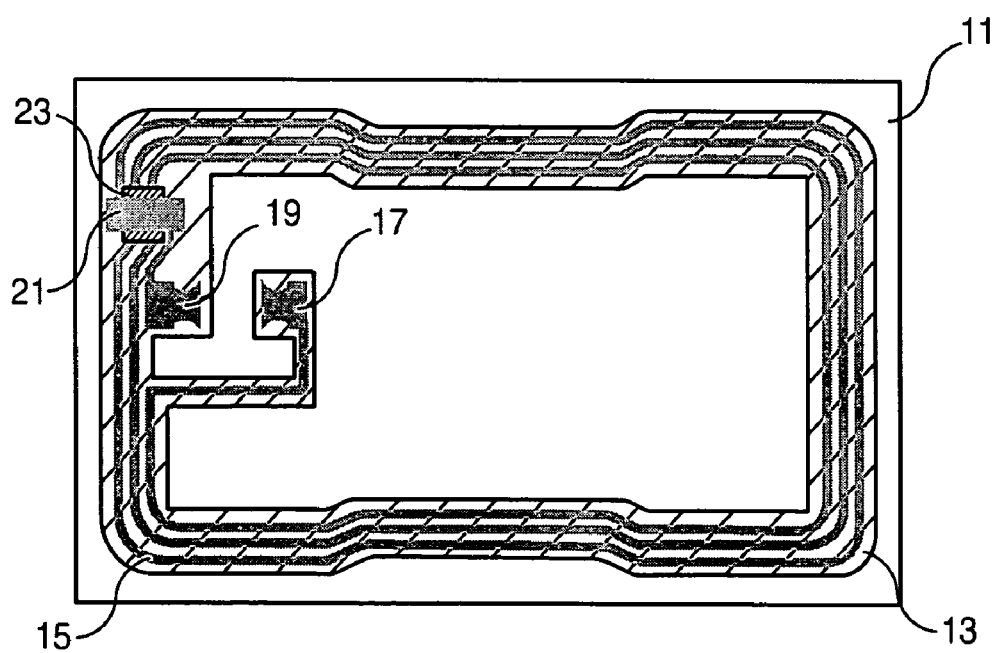
FIG. 5 represents the antenna screen printed on the support of a contactless smart card.

According to a preferred embodiment of a contactless smart card antenna shown in FIG. 5, the antenna is screen printed by conductive ink in several passes. The first pass consists in screen printing the turns 15 of the antenna and the two connection pads 17 and 19 of the antenna. The second pass consists in screen printing an insulating strip 23 to allow the turns of the antenna to overlap without electrical contact. The third pass consists in screen printing the electric bridge or cross-over 21. A fourth pass is provided to add a layer of ink on the connection pads 17 and 19. The turns 15 of the antenna connect the connection pad 19 at one of the ends of the cross-over 21 and the other end of the cross-over 21 up to the connection pad 17.

Figure 6A:
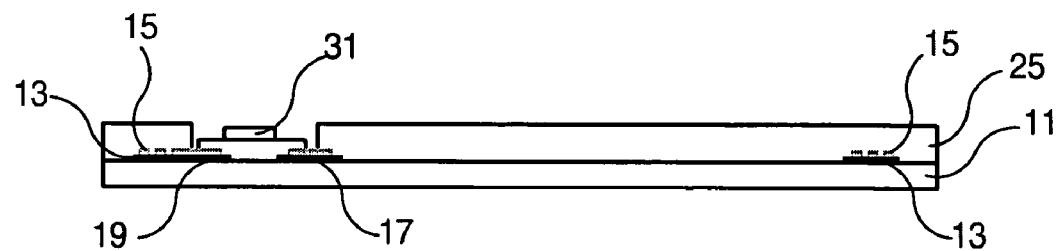
FIGS. 6a, 6b, and 6c represent a section of the contactless smart card after the module deposition, the first and second steps of lamination respectively.

According to FIG. 6a, the module 31 containing the chip is placed upside down so that the connections of the card are in contact with the connection pads 17 and 19 of the antenna. A perforated thermoplastic sheet 25 is placed on the antenna support 11 so that the module 31 faces the opening made previously in the sheet 25 and to avoid any extra thickness due to the module.

Figure 6B:
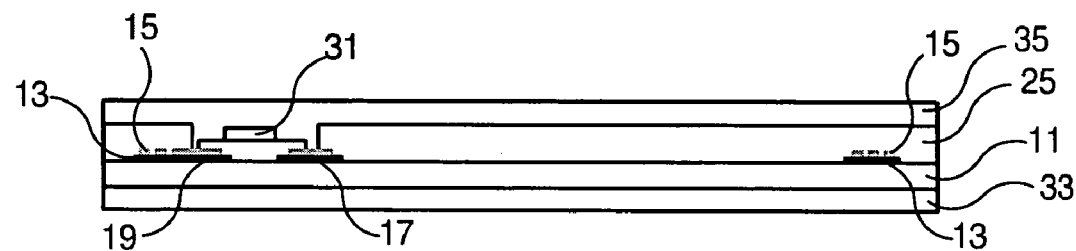
Figure 6C:
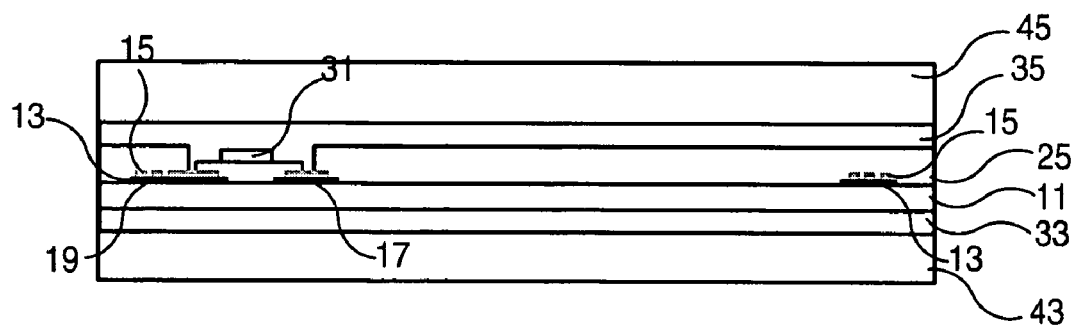

As for the lamination steps of the various layers that make up the card bodies of a hybrid contact-contactless smart card, the first lamination step of a contactless smart card is shown in FIG. 6b. This first lamination step consists in welding by hot press moulding two homogenous layers of thermoplastic on either side of the antenna support 11, one layer 35 on the thermoplastic layer 25 and one layer 33 on the face of the antenna support 11 that do not bear the antenna. During this first lamination step, the temperature must be sufficient for the material that makes up the sheets 25, 33 and 35 to soften and melt completely so as to trap the module 31 and the antenna. In this manner, during lamination, the antenna support 11 is trapped in the thermoplastic mass of layers 25, 33 and 35.

The second lamination step of various layers that make up the card involves laminating two bodies of the card on each side of the antenna support obtained after the first lamination step with reference to FIG. 6b. This second step, consists in welding two thermoplastic layers 43 and 45, constituting the card bodies, on the thermoplastic layers 33 and 35, by hot press moulding. The two card bodies 43 and 45 were previously printed with the customized graphic image of the card.

The two lamination steps described previously may be replaced by a single lamination step consisting in welding, by hot press moulding on each side of the antenna support at least two thermoplastic layers, corresponding for example to layers 35 and 45 on one side and 33 and 43 on the other side and constituting the two card bodies, without deviating from the scope of the invention.

The thermoplastic material used for all layers that make up the smart cards and mentioned in this document is preferably polyvinyl chloride (PVC), but could also be polyester (PET, PETG), polypropylene (PP), polycarbonate (PC) or acrylonitrile-butadiene-styrene (ABS).

The resin placed on zones 12 and 13 of the antenna support prior to printing of the antenna is used for its properties for the temperature and pressure of the first lamination step in relation to the same properties of the support on which it is applied. In particular, resin is used because it is dimensionally stable and because it remains hard during the first lamination step in relation to the plastic material on which it is placed. At 180° C. and at 280 bar, the plastic material of the antenna support melts and thus softens whereas resin is stable. In this manner, the circuit consisting of the antenna, connection pads and possibly the chip in the case of a contactless smart card, fixed on the support, is on a stable and hard base formed by the resin. During lamination, it is this entire base that moves in relation to its support and thereby, the antenna's shape factor is maintained as the latter is not subjected to shear stresses between the two top and bottom thermoplastic layers and therefore does not fracture. The resin provides the circuit with an overall stiffness during all the manufacturing steps of the card as it can withstand the temperature and pressure of various manufacturing steps of the smart card without losing its shape. The resin is deposited on zones 12 or 13 by a rapid and profitable method such as offset printing, screen printing, heliography or flexography. For this reason and for the sake of cost, the resin used may be rosin or an epoxy acrylate type resin. These resins are used in the manufacture of inks. The inks consist of about 70% varnish, 20% pigments and 10% additives such as wax, driers, thinners. Varnish contains vegetable oils, oil thinners and resins. The method according to the invention is carried out by depositing a material mainly consisting of resin. Advantageously, the method is carried out with an offset type ink consisting mainly of an epoxy acrylate type resin or consisting mainly of a rosin.

The invention claimed is:

1. A method for manufacturing an antenna of a hybrid contact-contactless or contactless smart card that includes a support on which the antenna is made, two card bodies on each side of said support, each of said card bodies comprising at least one thermoplastic layer, and a chip or a module connected to the antenna, comprising the steps of:

depositing a layer of a material consisting essentially of resin on a predetermined zone on said antenna support, said zone corresponding to the location where the entire antenna is to be printed or being slightly larger than said location, manufacturing the antenna, consisting essentially in screen printing turns and two connection pads of electrically conductive ink on said zone prepared beforehand on said support and subjecting said support to a heat treatment in order to bake said ink, wherein said layer of a material consisting essentially of a resin is more dimensionally stable than the antenna support at elevated temperature and pressure.

2. The manufacturing method according to claim 1, wherein said layer of a material consisting essentially of a resin is an offset ink.

3. The manufacturing method according to claim 2, wherein said ink consists essentially of rosin.

4. The manufacturing method according to claim 2, wherein said ink consists essentially of epoxy cyanoacrylate resin.

5. The manufacturing method according to claim 1 wherein said two card bodies are laminated on each side of said support in two steps, the first lamination step comprising welding on each side of said antenna support two homogenous thermoplastic sheets by hot press moulding at a temperature sufficient for the material that makes up the sheets to soften and to flow completely so as to eliminate all differences in thickness of the support, and a second lamination step performed after a duration corresponding to the time required for said thermoplastic sheets to solidify, said second step comprising welding on the antenna support of constant thickness obtained after the first lamination step two layers of plastic material, constituting the body of the card, by hot press moulding.

6. The manufacturing method according to claim 1, wherein said two card bodies are laminated on each side of said support according to a single lamination step comprising welding on each side of said antenna support at least two thermoplastic layers.

7. The method of claim 1, wherein said layer of a material consisting essentially of a resin is more dimensionally stable than the antenna support at 180° and 280 bar.

8. A hybrid contact-contactless or contactless smart card comprising an antenna on a support, said antenna comprising at least one turn of electrically conductive ink screen printed on said antenna support, two card bodies on each side of said support, each of said card bodies comprising at least one layer of plastic material, and a chip or module connected to the antenna wherein the antenna comprising turns and two connection pads of conductive ink is screen printed on a zone of the antenna support, said zone corresponding to the location where the entire antenna is to be printed or being slightly larger than said location and on which a material consisting essentially of resin has been deposited, wherein said material consisting essentially of resin is more dimensionally stable than the antenna support at elevated temperature and pressure.

9. The smart card according to claim 8, wherein said material is an offset ink.

10. The smart card according to claim 9, wherein said ink consists essentially of rosin.

11. The smart card according to claim 9, wherein said ink consists essentially of epoxy cyanoacrylate resin.

12. The smart card of claim 8, wherein said layer of a material consisting essentially of a resin is more dimensionally stable than the antenna support at 180° and 280 bar.

* * * * *